(12) United States Patent
Takahashi et al.

(10) Patent No.: US 8,800,400 B2
(45) Date of Patent: Aug. 12, 2014

(54) DOG-CLUTCH TRANSMISSION SYSTEM

(75) Inventors: Kosaku Takahashi, Wako (JP); Dai Arai, Wako (JP); Junya Watanabe, Wako (JP); Masataka Tanaka, Wako (JP); Masahiko Tsuchiya, Wako (JP); Satoru Nojima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 193 days.

(21) Appl. No.: 13/425,294

(22) Filed: Mar. 20, 2012

(65) Prior Publication Data

US 2012/0247241 A1 Oct. 4, 2012

(30) Foreign Application Priority Data

Mar. 31, 2011 (JP) ................. 2011-080603

(51) Int. Cl.
*F16H 3/22* (2006.01)
(52) U.S. Cl.
USPC .............................. 74/335; 74/340
(58) Field of Classification Search
USPC .................................. 74/330, 340, 335
See application file for complete search history.

(56) References Cited

U.S. PATENT DOCUMENTS

| | | | |
|---|---|---|---|
| 6,634,247 B2 * | 10/2003 | Pels et al. ..................... | 74/329 |
| 7,231,843 B2 * | 6/2007 | Gumpoltsberger et al. .... | 74/329 |
| 7,272,987 B2 * | 9/2007 | Hughes ......................... | 74/340 |
| 7,428,853 B2 * | 9/2008 | Tanba et al. ................... | 74/339 |
| 7,469,609 B2 * | 12/2008 | Baldwin ....................... | 74/330 |
| 8,038,564 B2 * | 10/2011 | Earhart et al. ................ | 475/218 |
| 8,151,662 B2 * | 4/2012 | Fitzgerald et al. ............ | 74/330 |
| 8,439,787 B2 * | 5/2013 | Salamandra et al. ......... | 475/207 |

FOREIGN PATENT DOCUMENTS

JP 2009-85323 A 4/2009

* cited by examiner

*Primary Examiner* — Ha D Ho
(74) *Attorney, Agent, or Firm* — Birch, Stewart, Kolasch & Birch, LLP

(57) ABSTRACT

A dog-clutch transmission system having dog-clutches is provided that can effectively lower the sound resulting from the engagement of dogs during the meshing of gears. A dog-clutch transmission system includes first gears installed adjacent to each other on respective shafts so as not to be rotatable relatively to the respective shafts and to be axially slidable; and second gears installed so as to be rotatable relatively to the respective shafts and not to be axially slidable. Each of the first gears has dog-teeth projecting in the axial direction and each of the other gears has dog-holes recessed in the axial direction. Speed-stages are switchable by bringing the dog-teeth and the dog-holes into engagement and disengagement. A speed-change ratio proportion of a change-speed ratio at an arbitrary n-speed speed-stage to a speed-change ratio at a (n+1)-speed speed-stage is set at 0.725 or more.

13 Claims, 13 Drawing Sheets

SPEED-CHANGE RATIO PROPORTION

| (n+1)-SPEED / n-SPEED | WORKING EXAMPLE 1 | COMPARATIVE EXAMPLE 1 | WORKING EXAMPLE 2 | WORKING EXAMPLE 3 | WORKING EXAMPLE 4 | COMPARATIVE EXAMPLE 2 |
|---|---|---|---|---|---|---|
| 2-SPEED / 1-SPEED | 0.725 | 0.705 | 0.764 | 0.742 | 0.756 | 0.714 |
| 3-SPEED / 2-SPEED | 0.787 | 0.767 | 0.779 | 0.729 | 0.767 | 0.764 |
| 4-SPEED / 3-SPEED | 0.823 | 0.793 | 0.826 | 0.793 | 0.849 | 0.825 |
| 5-SPEED / 4-SPEED | 0.890 | 0.910 | 0.871 | 0.910 | 0.873 | 0.861 |
| 6-SPEED / 5-SPEED | 0.910 | 0.941 | 0.910 | 0.941 | 0.916 | 0.811 |

FIG. 10

RATIO CHANGE RATE [(1-SPEED/2-SPEED) AND (2-SPEED/3-SPEED)]

| WORKING EXAMPLE 2 | WORKING EXAMPLE 3 | WORKING EXAMPLE 4 | COMPARATIVE EXAMPLE 3 | COMPARATIVE EXAMPLE 1 | COMPARATIVE EXAMPLE 4 |
|---|---|---|---|---|---|
| 1.93% | -1.78% | 1.43% | 7.87% | 8.08% | 7.82% |

FIG. 12

DOG-CLUTCH TRANSMISSION SYSTEM

CROSS-REFERENCE TO RELATED APPLICATIONS

This application claims priority under 35 U.S.C. §119(a) to Application No. 2011-080603, filed in Japan on Mar. 31, 2011. The entirety of the above-identified application is expressly incorporated herein by reference.

BACKGROUND OF THE INVENTION

1. Field of the Invention

The present invention relates generally to dog-clutch transmission systems and in particular to a dog-clutch transmission system having an automatic transmission.

2. Description of Background Art

Some multi-stage transmission systems having a plurality of gear-pairs have heretofore been configured such that speed-change gears and sleeves slidably installed on a main shaft and a counter shaft are displaced thereon to execute shifting. A configuration is known in which such shifting actions are performed by driving shift forks slid parallel to the main shaft and the counter shaft.

The transmission systems of this type include the so-called dog-clutch manual transmission system which manually performs a shifting action and a dog-clutch transmission system which automatically performs a shifting action via an actuator.

For example, Japanese Patent Laid-Open No. 2009-85323 discloses a dog-clutch transmission system. This dog-clutch transmission system includes a transmission having a plurality of gear-pairs between main shafts and a counter shaft and a twin-clutch disposed on the main shafts. This twin-clutch connects and disconnects the rotational drive power of an engine between the transmission and the engine. This twin-clutch transmission system is configured to have dog-clutches each installed between a slidable gear and a non-slidable gear in order to select one gear-pair transmitting rotational drive force, from the plurality of gear-pairs. The slidable gear is attached slidably in the axial direction and the non-slidable gear is attached non-slidably in the axial direction. The dog-clutch has projecting side dog-teeth and recessed-side dog-holes, which are allowed to engage with each other to perform the transmission of the rotational drive force between the slidable gear to be slid by a shift fork and a non-slidable gear adjacent thereto.

SUMMARY OF THE INVENTION

A dog-clutch manual transmission system emits engaging sounds because of a rotational difference between dogs that engage with each other at the time of the engagement of the dogs for shifting. Japanese Patent Laid-Open No. 2009-85323 discloses a twin-clutch transmission. This twin-clutch transmission performs shifting by alternately switching a first clutch and a second clutch. The first clutch connects and disconnects power transmitted to a first gear shaft having odd-stage gears. The second clutch connects and disconnects power transmitted to a second gear shaft having even-stage gears. In addition, the twin-clutch transmission may perform preliminary shifting by performing the engaging operation of dogs via a shifting actuator. Therefore, the dogs are engaged with each other for shifting at timing out of, i.e., regardless of, operator's operation. Thus, there is a problem in that an operator feels larger engaging sound than that of a manual transmission vehicle directly operated by the operator, which engaging sound hampers comfort.

The present invention has been made in view of the situations described above and aims to provide a dog-clutch transmission system having dog-clutches that can effectively lower the sound resulting from the engagement of dogs during the meshing of gears.

To achieve the above object, according to a first aspect of the present invention, a dog-clutch transmission system comprises: first gears installed adjacent to each other on respective shafts so as not to be rotatable relatively to the respective shafts and to be axially slidable; second gears installed so as to be rotatable relatively to the respective shafts and not to be axially slidable, wherein each of the first gears have dog-teeth projecting in the axial direction and each of the second gears have dog-holes recessed in the axial direction, wherein speed-stages are switchable by bringing the dog-teeth and the dog-holes into engagement and disengagement, and wherein a speed-change ratio proportion of a change-speed ratio at an arbitrary n-speed speed-stage to a speed-change ratio at a (n+1)-speed speed-stage is set at 0.725 or more.

According to a second aspect of the present invention, a ratio change rate between a speed-change ratio proportion of the change-speed ratio at the arbitrary n-speed speed-stage to the speed-change ratio at the (n+1)-speed speed-stage and a speed-change ratio proportion of the change-speed ratio at the (n+1)-speed speed-stage to a speed-change ratio at a (n+2)-speed speed-stage is set at 7.5% or below.

According to a third aspect of the present invention, including an automatic shifting mechanism having a shifting actuator for axially displacing the gears.

According to a fourth aspect of the present invention, the dog-clutch transmission system further comprises: a first clutch for connecting and disconnecting power transmitted to a first gear shaft having odd-speed-stage gears thereon; a second clutch for connecting and disconnecting power transmitted to a second gear shaft having even-speed-stage gears; and a twin-clutch type automatic transmission for performing shifting by alternately switching the first clutch and the second clutch.

According to a fifth aspect of the present invention, a dog engagement difference rotational energy of the dog-teeth (50) and the dog-holes (70) is smaller than 30 joules.

According to the first aspect of the present invention, the dog-clutch transmission system is such that a speed-change ratio proportion of a change-speed ratio at an arbitrary n-speed speed-stage to a speed-change ratio at a (n+1)-speed speed-stage is set at 0.725 or more. Therefore, a rotational difference between gears can be reduced, so that shock occurring when the dog teeth are engaged with the dog holes can be reduced. Thus, the engaging sound between the dogs can be suppressed to a low level.

According to the second aspect of the present invention, a ratio change rate between a speed-change ratio proportion of the speed-change ratio at the arbitrary speed-stage to the speed-change ratio at the speed-stage adjacent thereto is set at 7.5% or below. An inter-gear rotational difference between speed-change gears can be reduced. Consequently, shock occurring when the dog teeth are engaged with the dog holes can be suppressed to a low level. Thus, the engaging sound between the dogs can be reduced.

According to the third aspect of the present invention, in the case of including an automatic shifting mechanism having a shifting actuator for axially displacing the gears of the dog-clutch transmission system, a speed-change ratio proportion of the change-speed ratio at the arbitrary speed-stage to the speed-change ratio at the speed-stage adjacent thereto is set at a given value or more (0.725 or more). In addition, a ratio change rate is set at a given value or below (7.5% or below). Thus, dog engaging sound occurring when shifting is automatically performed can effectively be suppressed.

According to the fourth aspect of the present invention, in the case where the dog-clutch transmission system is configured to have a twin-clutch automatic transmission, a speed-change ratio proportion of the change-speed ratio at the arbitrary speed-stage to the speed-change ratio at the speed-stage adjacent thereto is set at a given value or more. In addition, a ratio change rate is set at a given value or below. Thus, engaging sound of the dogs occurring when preliminary shifting is performed can be suppressed particularly effectively. The preliminary shifting is such that engagement of a speed-stage that will be shifted following the speed-stage at which power is disconnected is preliminarily established.

According to the fifth aspect of the present invention, a dog engagement difference rotational energy of the dog-teeth and the dog-holes is set at smaller than 30 joules. Therefore, shock occurring at the time of the engagement of dogs can be suppressed to a low level. Thus, an effect of reducing gear rattle can be produced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a table showing speed-change ratio proportions in working examples of the present invention and comparative examples;

FIG. 12 is a table showing ratio change rates in the working examples of the invention and the comparative examples.

DETAILED DESCRIPTION OF THE PREFERRED EMBODIMENTS

Figure 1:
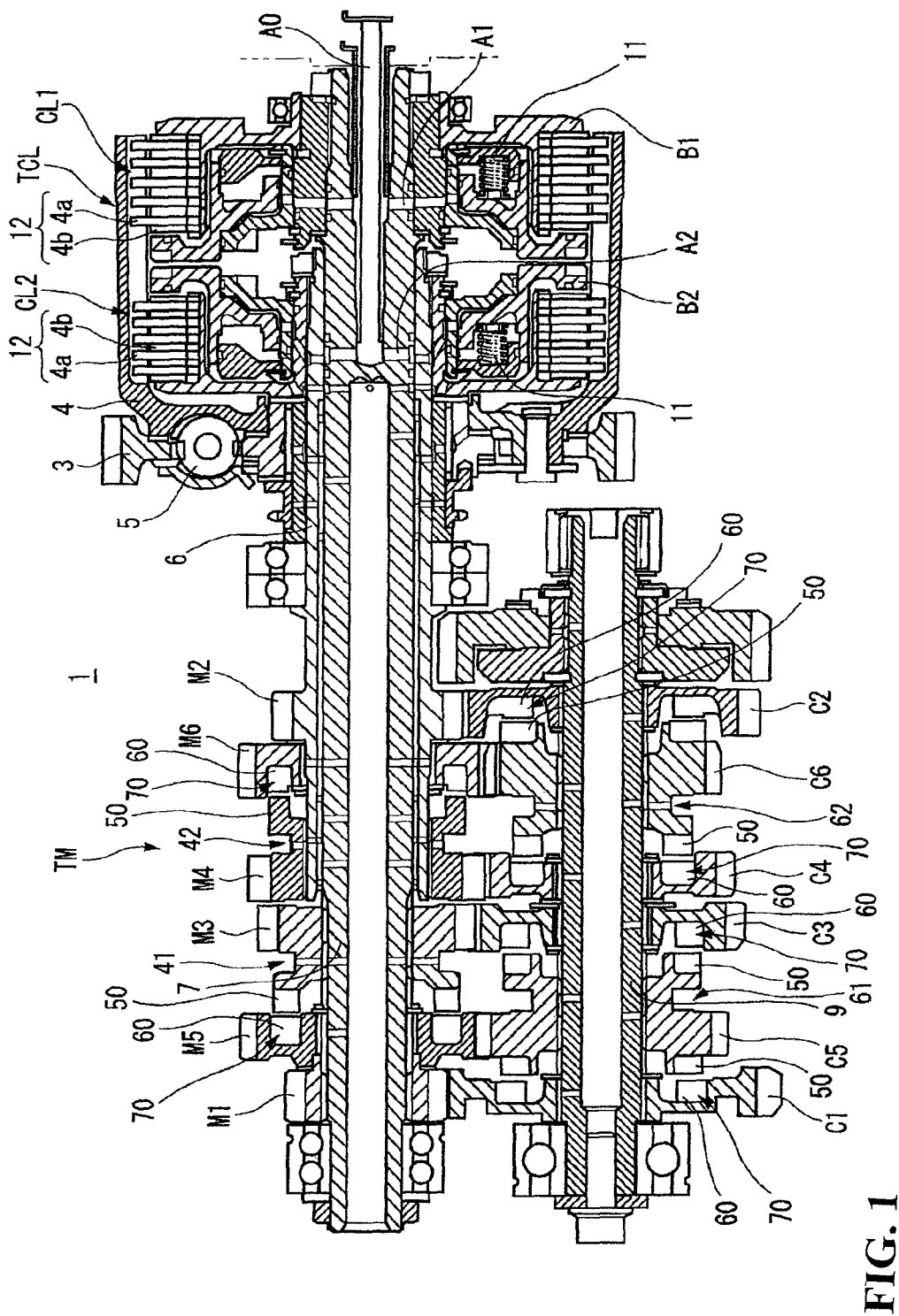
FIG. 1 is a cross-sectional view of a twin-clutch type dog-clutch transmission system according to an embodiment of the present invention.

The present invention will now be described with reference to the accompanying drawings, wherein the same reference numerals have been used to identify the same or similar elements throughout the several views.

One embodiment of the present invention will hereinafter be described.

A detailed description is first given of the embodiment of the invention with reference to FIGS. 1 to 9. Incidentally, the figures should be viewed consistent with the orientation of the reference numerals.

Figure 2:
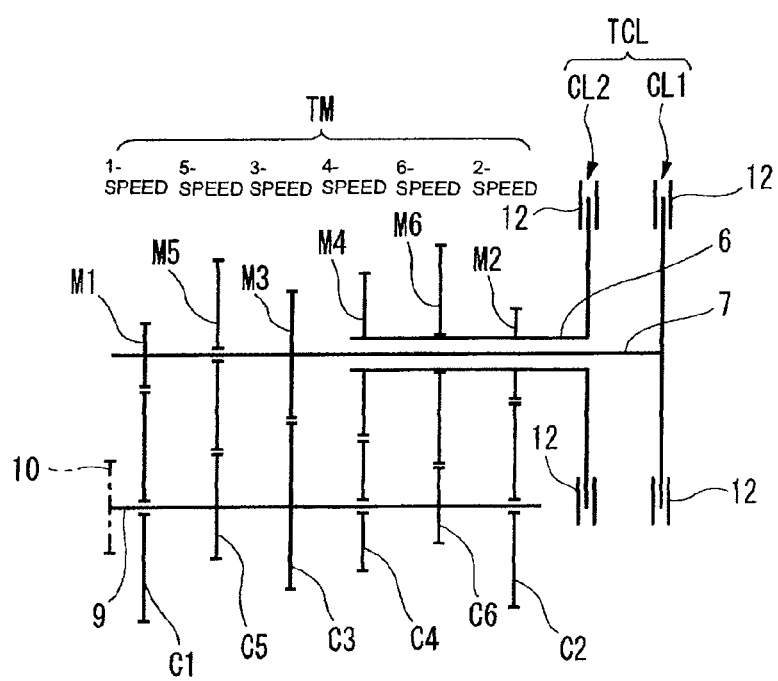
FIG. 2 is a skeleton view illustrating an arrangement relationship among speed-change gears of the twin-clutch type dog-clutch transmission system.

FIG. 1 is a cross-sectional view of a twin-clutch type dog-clutch transmission system 1 according to the present embodiment. FIG. 2 is a skeleton view illustrating an arrangement relationship among speed-change gears of the dog-clutch transmission system 1 according to the embodiment.

The dog-clutch transmission system 1 of the embodiment includes a twin clutch TCL composed of a first clutch CL1 and a second clutch CL2 and a forward six-stage sequential-type transmission TM. Incidentally, the dog clutch transmission system 1, along with an engine (not shown) as a power source of a vehicle, is housed inside a crankcase.

The overall configuration and operation of the dog-clutch transmission system 1 according to the embodiment is described with reference to FIGS. 1 and 2.

The dog-clutch transmission system 1 is such that a rotational drive force is transmitted from a crankshaft (not shown) of the engine to a primary gear 3 having a shock absorbing mechanism 5. The rotational drive force is outputted from a twin clutch TCL on the right side in the figure to a counter shaft 9 on the left side in the figure. More specifically, the twin clutch TCL is installed so as to be able to be connected to an outer main shaft 6 as an outer tube and to an inner main shaft 7 as an inner tube rotatably supported by the outer main shaft 6. Six gear-pairs are installed between the main shafts 6, 7 and the counter shaft 9. The rotational drive power is outputted to the counter shaft 9 via the six gear-pairs.

A drive sprocket 10 (see FIG. 2) is attached to one end side of the counter shaft 9. The rotational drive force of the engine is transmitted to a drive wheel (not shown) of a vehicle via a drive chain (not shown) wound around the drive sprocket 10.

Referring to FIGS. 1 and 2, the transmission TM disposed on the left side of the twin-clutch TCL has the six gear-pairs between the main shafts 6, 7 and the counter shaft 9. A gear-pair through which rotational drive force is outputted can be selected by combining a position of a gear attached on a corresponding shaft so as to be slidable in the axial direction of the shaft, with the disengaged and engaged states of the first clutch CL1 and of the second clutch CL2.

The twin-clutch TCL is disposed inside a clutch case 4 rotated integrally with the primary gear 3. The following is easily understandable if the skeleton view of FIG. 2 is used. The first clutch CL1 on the right side in the figure is non-rotatably attached to the inner main shaft 7. The second clutch CL2 on the left side in the figure is non-rotatably attached to the outer main shaft 6. As shown in FIG. 1, a clutch board 12 is disposed between the clutch case 4 and each of the clutches CL1, CL2. The clutch board 12 is composed of five clutch plates 4a non-rotatably supported by the clutch case 4 and five friction plates 4b non-rotatably supported by each of the clutches CL1, CL2.

The first and second clutches CL1, CL2 in the twin-clutch TCL in the present embodiment are configured as below. Hydraulic pressure from a hydraulic pump driven by the rotation of the crankshaft is supplied to the first or second clutch CL1, CL2 to generate a friction force in the corresponding clutch board 12. Thus, the first or second clutch CL1, CL2 switches to an engaged state. A distributor (not shown) forming two dual-tube-like hydraulic pathways A0 is embedded inside the inner main shaft 7. If hydraulic pressure is supplied to a hydraulic line A1 formed in the inner main shaft 7, a piston B1 is slid leftward in the figure against the elastic force of an elastic member 11 such as a spring or the like. This switches the first clutch CL1 into the engaged state. Similarly to this, if hydraulic pressure is supplied to a hydraulic line A2, a piston B2 is slid leftward in the figure. This switches the second clutch CL2 into the engaged state. If the supplied hydraulic pressure lowers, the pistons B1, B2 of both the clutches CL1, C12 are returned to respective original positions by the elastic force of the elastic member 11.

Incidentally, the supply of hydraulic pressure to the first and second clutches CL1, CL2 is executed by a solenoid valve or the like switching the supply destination of the hydraulic pressure constantly generated by a hydraulic pump rotated by the crankshaft.

With the configuration described above, the rotational drive force of the primary gear 3 is in the state of rotating only the clutch case 4 as long as the hydraulic pressure is not supplied to the first clutch CL1 or the second clutch CL2. However, if the hydraulic pressure is supplied to the first clutch CL1 or the second clutch CL2, the rotational drive force of the primary gear 3 can rotatably drive the outer main shaft 6 or the inner main shaft 7 integrally with the clutch case 4.

Incidentally, when the outer main shaft 6 or the inner main shaft 7 is rotated, partial clutch engagement can be generated by arbitrarily adjusting the magnitude of supplied hydraulic pressure.

The inner main shaft 7 connected to the first clutch CL1 supports drive gears M1, M3, M5 for odd-speed stages (first-speed, second-speed and fifth-speed). The first-speed drive gear M1 is formed integrally with the inner main shaft 7. The third-speed drive gear M3 is mounted to the inner main shaft 7 so as to be axially slidable and not to be circumferentially rotatable. The fifth-speed drive gear M5 is mounted to the inner main shaft 7 so as not to be axially slidable and to be circumferentially rotatable. The drive gear M5 has dowel columns 60 formed with dog holes 70 described later. The drive gear M3 adjacent to the gear M5 has dog teeth 50 facing the dowel columns 60.

On the other hand, the outer main shaft 6 connected to the second clutch CL2 supports drive gears M2, M4, M6 for even-speed stages (second-speed, fourth-speed and sixth-speed). The second-speed drive gear M2 is formed integrally with the outer main shaft 6. The fourth-speed drive gear M4 is mounted to the outer main shaft 6 so as to be axially slidable and not to be circumferentially rotatable. The sixth-speed drive gear M6 is mounted to the outer main shaft 6 so as not to be axially slidable and to be circumferentially rotatable.

The drive gear M6 has dowel columns 60 formed with dog holes 70. The drive gear M4 adjacent to the gear M6 has dog teeth 50 facing the dowel columns 60.

The counter shaft 9 supports driven gears C1 to C6 engaged with the corresponding drive gears M1 to M6. First- to fourth-speed driven gears C1, C2, C3, C4 are mounted to the counter shaft 9 so as not to be axially slidable and to be circumferentially rotatable. On the other hand, fifth- and sixth-speed driven gears C5, C6 are mounted to the counter shaft 9 so as to be axially slidable and not to be circumferentially rotatable.

The driven gear C1 has dowel columns 60 formed with dog holes 70. The driven gear C5 adjacent to the gear C1 has dog teeth 50 (which projects toward the gear C1 in FIG. 1) facing the dowel columns 60. The driven gear C3 has dowel columns 60 formed with dog holes 70. The driven gear C5 adjacent to the gear C3 has other dog teeth 50 (which projects toward the gear C3 in FIG. 1) facing the dowel columns 60 formed with the dog hole 70. In other words, the driven gear C5 has at both ends the dog teeth 50 each engageable with a corresponding one of the two driven gears C1, C3 adjacent to the driven gear C5.

Similarly to the driven gear C5, also the driven gear C6 has at both ends the dog teeth 50 each engageable with a corresponding one of the two driven gears C2, C4 adjacent to the driven gear C5. Specifically, the dog teeth 50 of the driven gear C6 are configured to be engageable with the dowel columns 60 of the gears C2, C4.

Figure 5:
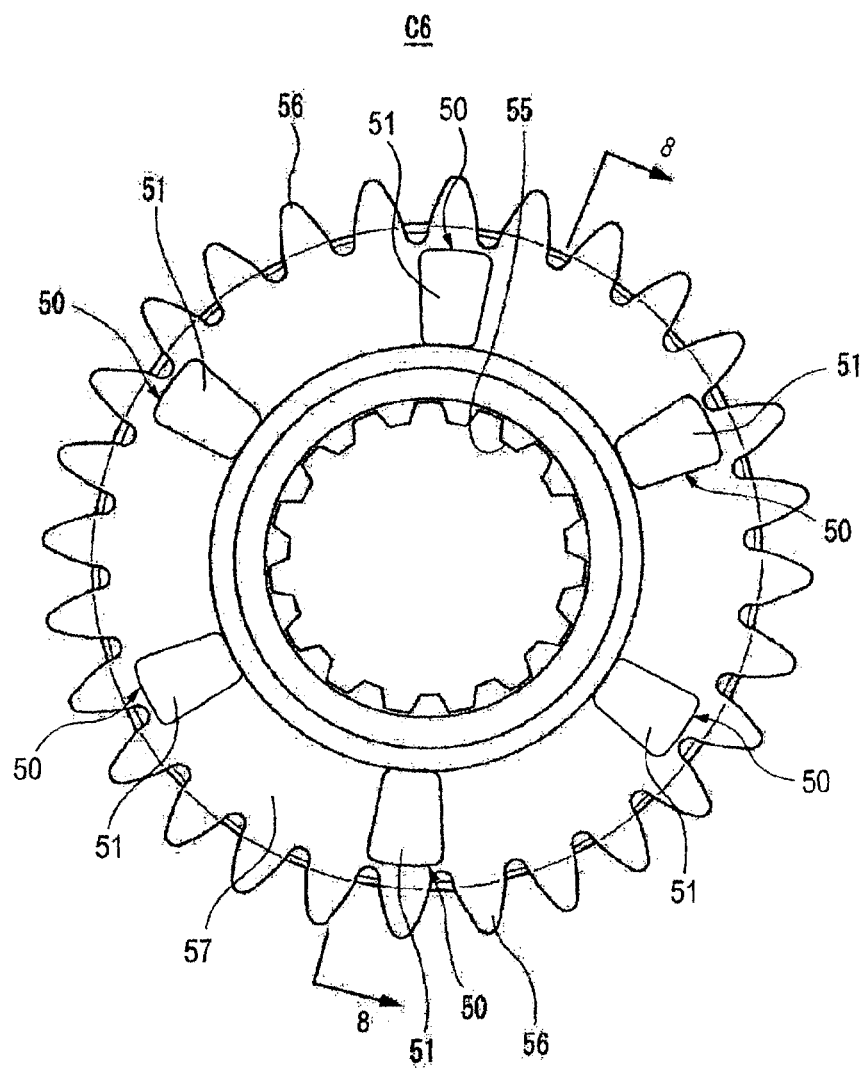
FIG. 5 is a plan view of a gear C6, viewed from a dog-tooth side, of a transmission TM shown in FIG. 1.
Figure 6:
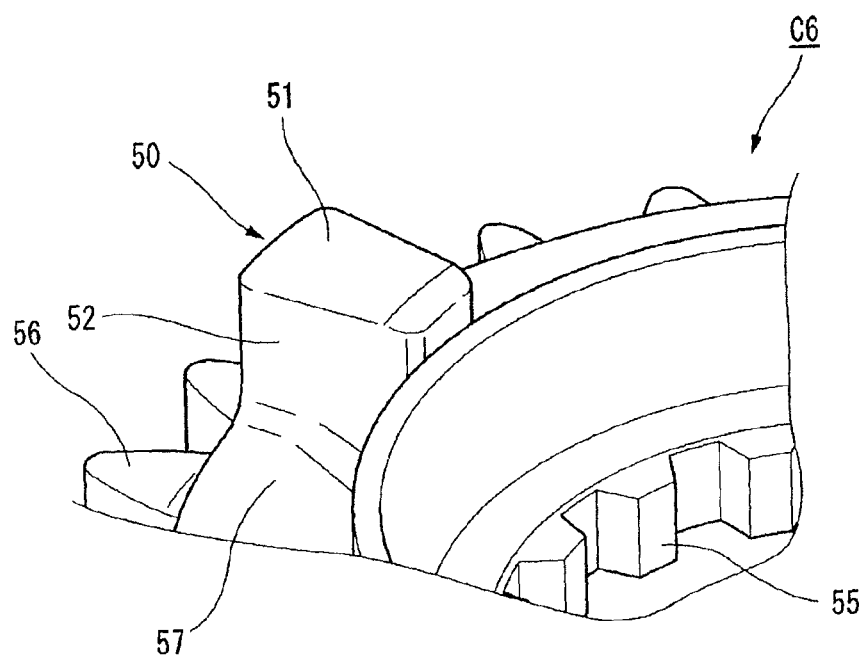
FIG. 6 is a perspective view of a dog tooth and the vicinity of the gear C6 of the transmission TM shown in FIG. 1.
Figure 7:
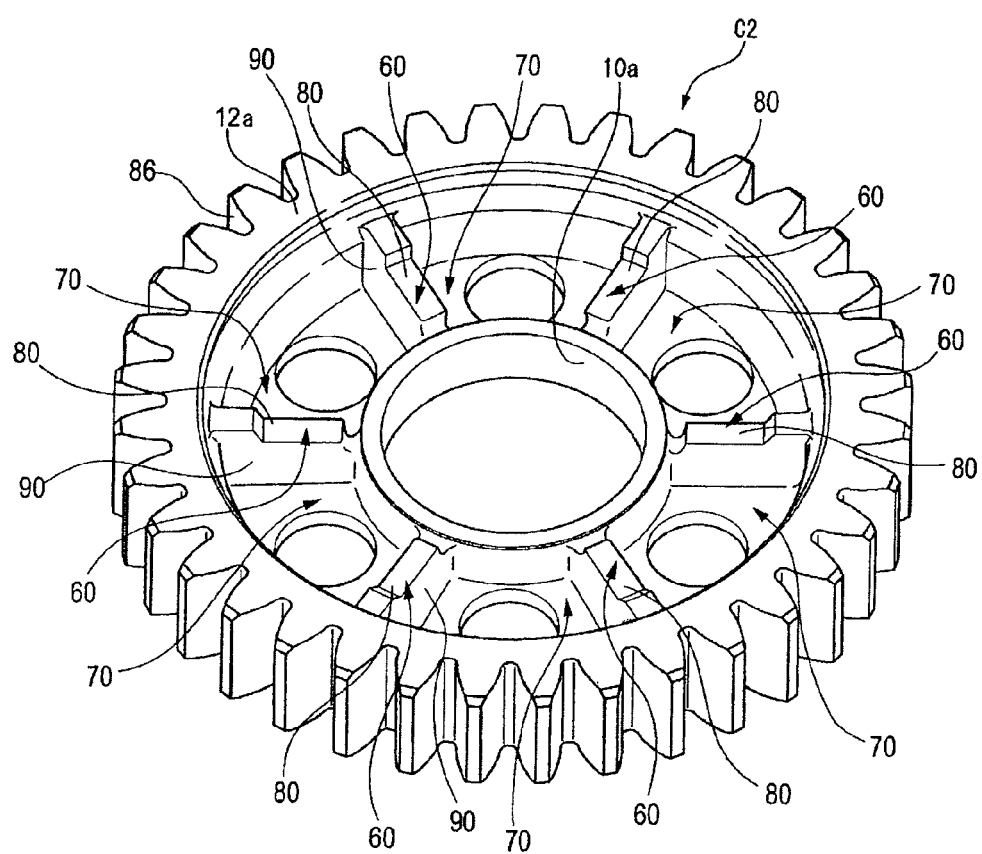
FIG. 7 is a perspective view of a gear C2, viewed from a dog-hole side, of the transmission shown in FIG. 1.

The twin-clutch type dog-clutch transmission system 1 according to the embodiment has the dog-clutches as described above applied to the configuration in which the rotational drive force is connected and disconnected between the slidable gears and non-slidable gears. As shown in FIGS. 5 to 7, the dog-clutch permits the transmission of the rotational drive force through the engagement between concave and convex shapes composed of the dog teeth 50 and dog holes 70 (formed in the dowel column 60). The dog-clutch can transmit a drive force at a small transmission loss with the simple configuration. This can simplify the configuration of the transmission TM when compared with a transmission configured with a synchromesh mechanism between a slidable gear and a non-slidable gear for synchronizing the rotations thereof. Thus, the downsizing and weight saving of the twin-clutch transmission system 1 can be achieved.

Among the gear trains described above, the drive gears M3, M4 and the driven gears C5, C6, i.e., "the slidable gears" disposed axially slidable are configured to be slid by the operation of shift forks described later. Therefore, the drive gears M3, M4 and the driven gears C5, C6 are formed with respective engaging grooves 41, 42, 61, 62 adapted to receive corresponding claw portions of the shift forks engaged therewith.

The speed-change gears (the drive gears M1, M2, M5, M6 and the driven gears C1, C2, C3, C4) other than the slidable gears mentioned above, i.e., "the non-slidable gears" not slidable axially are configured to connect and disconnect the rotational drive force through the dog teeth 50 and the dog holes 70 between the adjacent slidable gears and the speed-change gears.

With the configuration as described above, the twin-clutch transmission system 1 of the embodiment can arbitrarily select one gear-pair transmitting the rotational drive force of the engine to the drive wheel by the combinations of the positions of the slidable gears (the drive gears M3, M4 and the driven gears C5, C6) and the engaged and disengaged states of both the clutches CL1, CL2).

The first clutch CL1 connects and disconnects the rotational drive force of the odd-speed stages (first-, second- and fifth-speeds). On the other hand, the second clutch CL2 connects and disconnects the rotational drive force of the even-speed stages (second-, fourth- and sixth-speed stages). This means that when upshift is sequentially performed, the engaged states of the first clutch CL1 and the second clutch CL2 will alternately be switched.

A description will now be provided of a shifting mechanism 20 of the dog-clutch transmission system 1 according to the embodiment.

Figure 3:
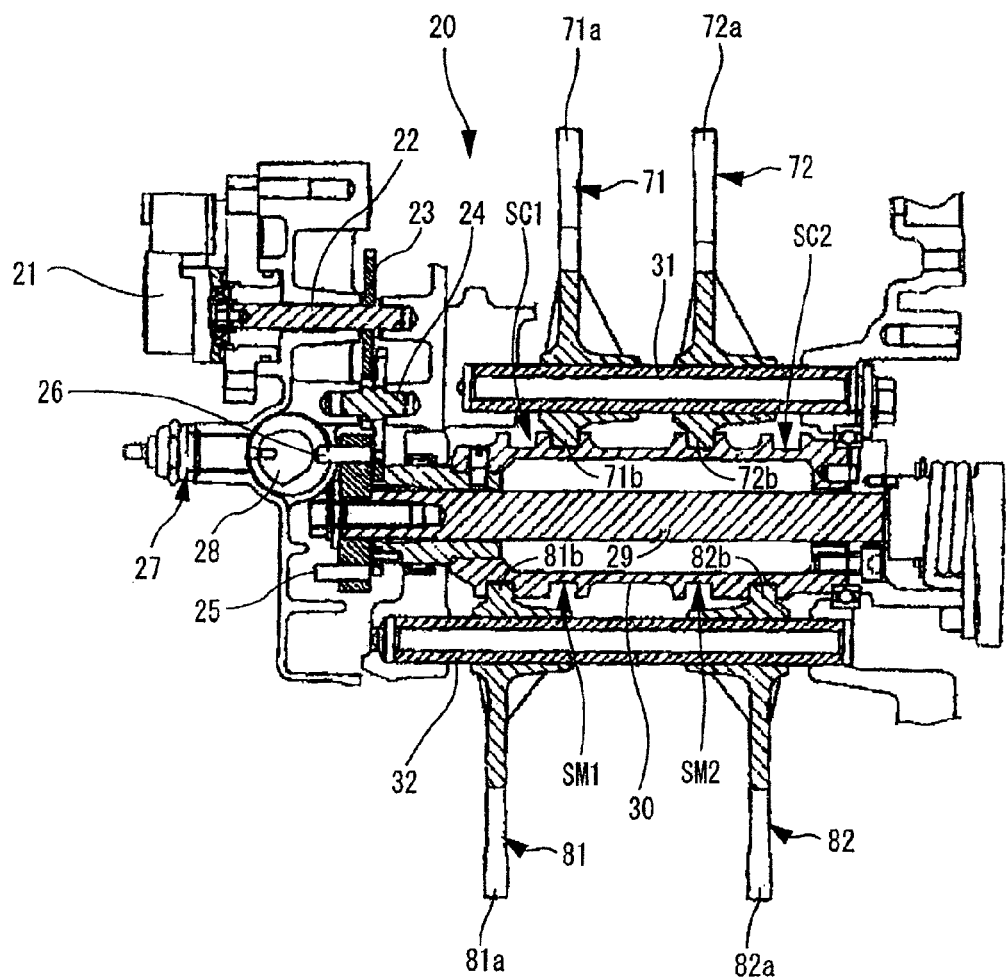
FIG. 3 is a cross-sectional view of a shifting mechanism for driving slidable gears of a transmission.
Figure 4:
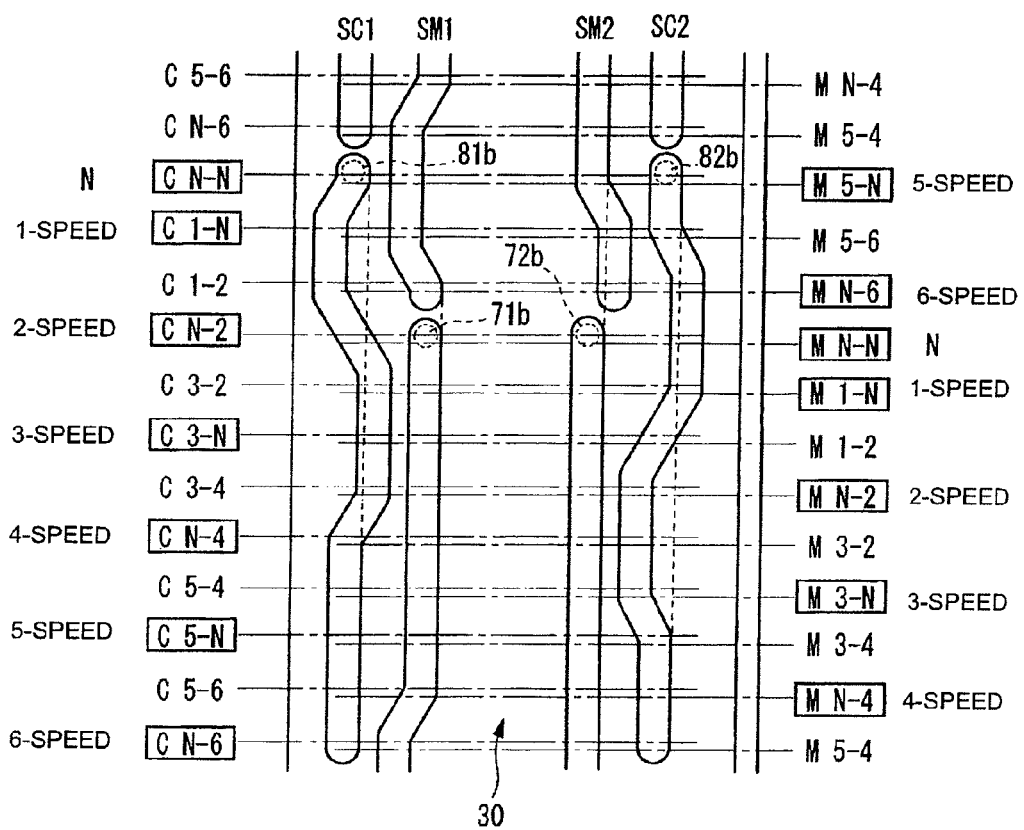
FIG. 4 is a development view illustrating shapes of guide grooves of a shift drum.

FIG. 3 is a cross-sectional view of the shifting mechanism 20. FIG. 4 is a development view illustrating shapes of guide grooves of a shift drum 30 of the shifting mechanism 20.

The shifting mechanism 20 according to the present embodiment has four shift forks 71, 72, 81, 82 slidably attached to two corresponding guide shafts 31, 32 in order to drive the above-described four slidable gears (the drive gears M3, M4 and the driven gears C5, C6).

The four shift forks 71, 72, 81, 82 have corresponding guide claws (71a, 72a, 81a, 82a) to be engaged with the associated slidable gears and corresponding cylindrical convex portions (71b, 72b, 81b, 82b) engaged with the corresponding guide grooves formed on the shift drum 30.

The shift fork 71 engaged with the third-speed drive gear M3 and the shift fork 72 engaged with the fourth-speed drive gear M4 are attached to the guide shaft 31. The shift fork 81 engaged with the fifth-speed driven gear C5 and the shift fork 82 engaged with the sixth-speed driven gear C6 are attached to the other guide shaft 32.

Guide grooves SM1, SM2 engaged with the respective shift forks 71, 72 on the main shaft side and guide grooves SC1, SC2 engaged with the respective shift forks 81, 82 on the counter shaft side are formed on the front surface of the shift drum 30 disposed parallel to the guide shafts 31, 32. In this way, the slidable gears M3, M4, C5, C6 are driven along the corresponding shapes of the four guide grooves by the turning of the shift drum 30.

The shift drum 30 is turnably driven to a given position by an electric motor 21 as an actuator. The rotational drive force of the electric motor 21 is transmitted via a first gear 23 secured to a rotating shaft 22 and a second gear 24 meshed with the first gear 23 to a shift drum shaft 29 supporting the hollow cylindrical shift drum 30. The turning position of the shift drum 30 is detected by a shift position sensor 27. The shift position sensor 27 is configured to be able to detect the turning position of the shift drum 30 on the basis of a turning position of a sensor cam 28. This sensor cam 28 is turned by a sensor pin 26 embedded in a sensor plate 25 secured by the shift drum shaft 29.

With the configuration described above, the dog-clutch transmission system 1 concurrently exercises the turning drive control of the shift drum 30 and engagement-disengagement control of the twin-clutch TCL. In this way, the dog-clutch transmission system 1 can execute automatic shifting in response to engine rotation speed, vehicle speed and the like and semiautomatic shifting undergoing occupant's shifting operation with a shifting switch or the like.

The positional relationship between the turning position of the shift drum 30 and the four shift forks in the present embodiment and their basic operation are described with reference to the development view of FIG. 4.

Both of the guide shafts 31, 32 in the present embodiment are disposed at respective positions circumferentially away from each other by approximately 90°. For example, if the turning position of the shift drum 30 is at neutral (N), the shift forks 81, 82 are located at indication "C N-N" on the left hand in the figure, whereas the shift forks 71, 72 are located at indication "M N-N" on the right hand in the figure.

In FIG. 4, broken line circles identify the respective positions of the cylindrical convex portions (71b, 72b, 81b, 82b) when at neutral. Given turning positions continuous downward from indication "C N-N" on the left hand in the figure and given turning positions continuous downward from indication "M N-N" on the right hand in the figure are provided at intervals of 30°.

The slide positions of the shift forks determined by the corresponding guide grooves are configured so that the guide grooves SM1, SM2 on the main shaft 6, 7 side may have two positions: "the left position" or "the right position." In contrast to this, the guide grooves SC1, SC2 on the counter shaft 9 side have three positions: "the left position," "the middle position" or "the right position."

In the present embodiment, when at neutral the shift forks (71, 72, 81, 82) are located as follows: the shift fork 81: the middle position, the shift fork 82: the middle position, the shift fork 71: the right position, and the shift fork 72: the left position. This means the state where the four slidable gears driven by the corresponding shift forks are not engaged with any of the non-slidable gears adjacent thereto. Therefore, if the first clutch CL1 or the second clutch CL2 is brought into engagement, the rotational drive force of the primary gear 3 will not transmitted to the counter shaft 9.

The shift drum 30 is next turned from the position encountered during the neutral described above to the position ("C 1-N" and "M 1-N") corresponding to the first-speed gear. In this case, the shift fork 81 is switched from the middle position to the left position, whereby the fifth-speed driven gear C5 is switched from the middle position to the left position.

In this way, the fifth-speed driven gear C5 is meshed with the first-speed driven gear C1 via the dog-clutch, leading to the state where the rotational drive force can be transmitted. In this state, if the first clutch CL1 is switched into the engaged state, the rotational drive force is transmitted in the order: the inner main shaft 7→the first-speed drive gear M1→the first-speed driven gear C1→the fifth-speed driven gear C5→the counter shaft 9, and outputted from the drive sprocket 10.

After shifting to the first-speed gear has been completed, the shift drum 30 is automatically turned in an upshift direction by an angle of 30 degrees. This turning operation is called "upshift side preliminary shifting," which intends to complete shifting only by the switching of the engaged state of the twin-clutch TCL when a command of shifting from the first-speed to the second-speed is issued. This upshift side preliminary shifting displaces the two guide shafts to the corresponding positions of indications "C 1-2" and "M 1-2" on the left hand and the right hand, respectively, in the figure with respect to the shift drum 30.

The change of the guide groove as a result of the upshift side preliminary shifting is only the switching of the guide groove SC2 from the middle position to the right position. In this way, the shift fork 82 is displaced to the right position, so that the driven gear C6 is meshed with the driven gear C2 via the dog-clutch. At the point of time when the upshift side preliminary shifting from the first-speed to the second-speed is completed, the second clutch CL2 is in the disengaged state. Therefore, the outer main shaft 6 is rotated in a driven manner by the viscosity of the lubricating oil filled between the inner main shaft 7 and the outer main shaft 6.

The slide operation of the driven gear C6 resulting from the upshift side preliminary shifting as described above completes preparations for transmitting rotational drive force via the second-speed gears. In this state, if a command of shifting from the first-speed to the second-speed is issued, the first clutch C1 is disengaged and the second clutch CL2 is switched into the engaged state. Because of this changing operation of the twin-clutch, the rotational drive force is outputted at once via the second-speed gear without discontinuity.

After the shifting action from the first-speed to the second-speed has been completed, upshift side preliminary shifting is executed to complete a shifting action from the second-speed to the third-speed only by changing the twin-clutch TCL. In this upshift side preliminary shifting from the second-speed to the third-speed, the guide shaft on the counter shaft 9 side is displaced from the position of indication "C 1-2" to indication "C 3-2" on the left hand in the figure. In addition, the guide shaft on the main shafts 6, 7 side is displaced from indication "M 1-2" to indication "M 3-2" on the right hand in the figure. The change of the guide groove along with this displacement is only that the guide groove SC1 is switched from the left position to the right position. Consequently, the shift fork 81 is displaced from the left position to the right position. Thus, the fifth-speed driven gear C5 and the third-speed driven gear C3 are meshed with each other through the dog-clutch (the clutch structure composed of the dog teeth 50 and the dog holes 70).

After the upshift-side preliminary shifting from the second-speed to the third-speed has been completed, the engaged state of the twin-clutch is switched from the second clutch CL2 to the first clutch CL1. In other words, only the changing of the clutch brings the state where a shifting action from the second-speed to the third-speed can be executed. Thereafter, this upshift side preliminary shifting is similarly executed until the fifth-speed gear is selected.

At the time of the upshift side preliminary shifting from the second-speed to the third-speed described above, the guide groove SC1 passes the middle position of indication "C N-2" on the left hand in the figure, i.e., the position where meshing through the dog-clutch is not performed. The shift drum 30 is detected every 30 degrees by the shift position sensor 27. In addition, the turning speed of the shift drum 30 can minutely be adjusted by the electric motor 21. Because of this, it is possible, for example, to make the turning speed from indication "C 1-2" to "C N-2" on the left hand in the figure, different from that from indication "C N-2" to "C 3-2." In other words, it is possible to make the speed encountered when the dog-clutch is disengaged between the driven gears C1 and C5, different from the speed encountered when the dog-clutch is engaged between the driven gears C5 and C3. In addition, it is possible to perform "neutral-waiting" in which the shift drum 30 is stopped for a given period of time at the position "C N-2."

In this way, it is possible to reduce shift shock likely to occur when the dog teeth 50 and the dowel columns 60 are engaged with or disengaged from each other. In the present embodiment, as described later, the drive timing and drive speed of the shift drum 30 can arbitrarily be controlled to bring the dog teeth 50 and the dowel columns 60 into desirable contact with each other. In addition, the drive timing of the shift drum 30 can sequentially be adjusted in accordance with the speed-change stage, engine speed and the like at the time of shifting.

The engagement structure of the dog teeth 50 and the dog holes 70 in the present embodiment will now be described in detail with reference to FIGS. 1 and 5 to 9, taking the driven gears C6 and C2 as an example.

The gears C6, C2 are adjacent to each other on the counter shaft 9 as described above. The gear C6 cannot be rotated relatively to the counter shaft 9 and can be slid in the axial direction thereof. The gear C2 cannot be slid in the axial direction of the counter shaft 9 and can be rotated in the circumferential direction thereof. The gear C6 has the dog teeth 50 projecting in the axial direction. On the other hand, the gear C2 has the dog holes 70 recessed in the axial direction and facing the dog teeth 50. The dog holes 70 are formed as dents. The sliding action of the gear C6 can be performed through the shifting mechanism 20 as described above.

In the present embodiment, as shown in FIG. 5, the gear C6 is formed at the outermost circumference with gear teeth 56 meshed with the gear M6. In addition, the gear C6 has six dog teeth 50 projecting axially from an end face 57. As shown in FIG. 6, the dog tooth 50 has a tip portion formed as an opposite wall surface 51 facing an opposite wall surface 80 of the dowel column 60. In addition, the dog tooth 50 has lateral portions formed as engaging lateral surfaces 52 to be engaged with corresponding lateral surfaces 90 of the dowel column 60.

Incidentally, as shown in FIG. 6, the gear C6 has splines 55 located on the inner circumference thereof. The splines 55 are arbitrarily engaged with the counter shaft 9 so that the gear C6 can be slid in the axial direction of the counter shaft 9.

On the other hand, as shown in FIG. 7, the gear C2 is formed at the outermost circumference with gear teeth 86 to be meshed with the gear M2. In addition, the gear C2 has six dog holes 70 each formed between corresponding two of six dowel columns 60 and axially recessed in the axial direction so as to be able to receive the dog teeth 50 coming thereinto.

As shown in FIG. 7, the gear C2 has a flat surface 10a formed on the inner circumferential surface thereof. In addition, the gear C2 is configured to be arbitrarily position-restricted in the axial direction and to be rotatable around the counter shaft 9.

Figure 8:
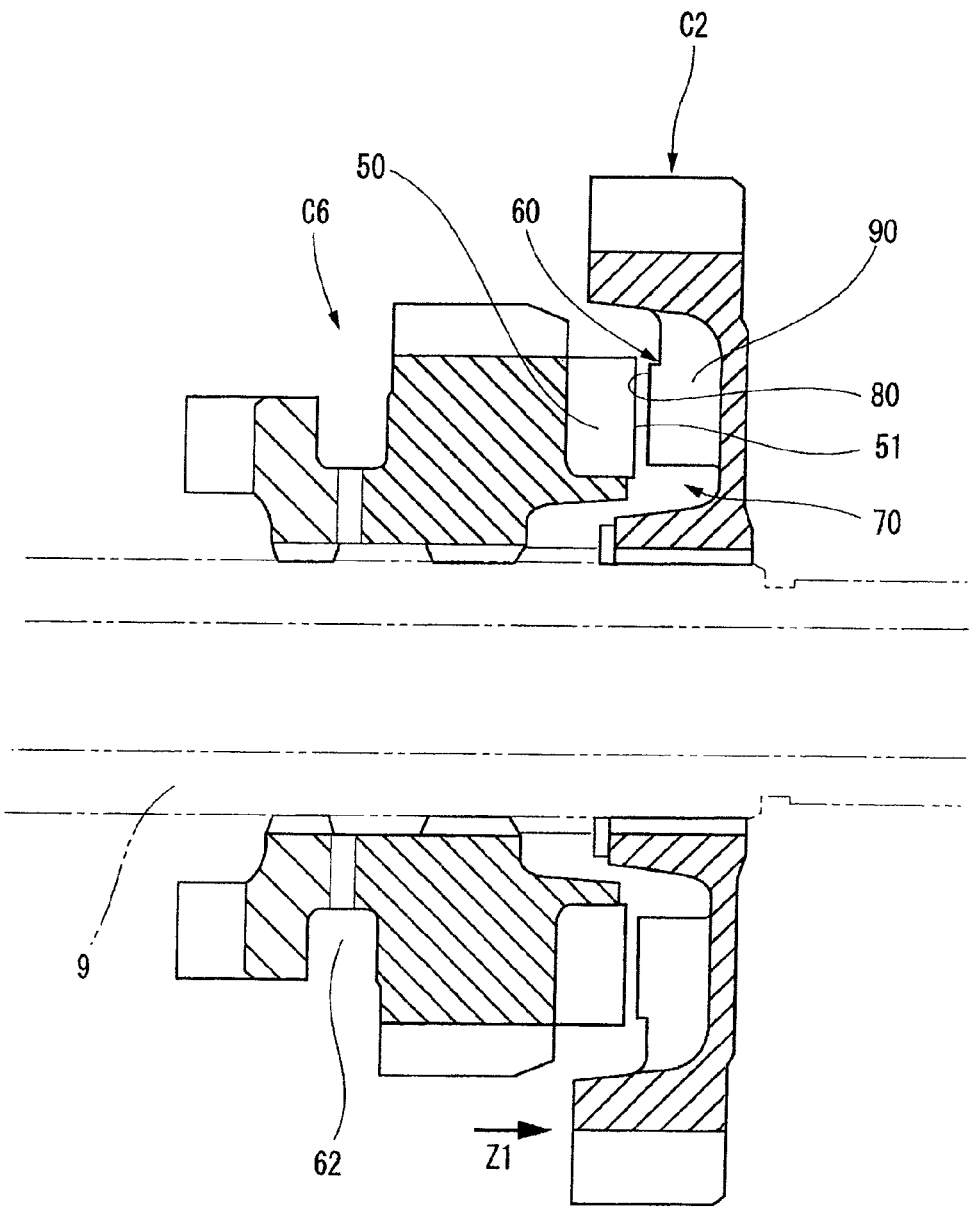
FIG. 8 is a schematic cross-sectional view illustrating a non-contact state between the gear C6 with gear C2 of the transmission TM shown in FIG. 1 (a cross-section at a position along line 8-8 in FIG. 5)

As shown in FIG. 8 of an enlarged view, the gears C2 and C6 configured as described above are arranged to face each other so as to permit the engagement of the dog teeth 50 with the dog holes 70. That is to say, when the gear C6 is slidably displaced toward the gear C2 (the displacement in the direction of arrow Z3 in FIG. 9), the dog teeth 50 go into the corresponding dog holes 70.

In the present embodiment, when the speed-stage is switched, the shift drum 30 is driven by the shifting mechanism 20 described above so as to bring the dog teeth 50 into engagement with the corresponding dowel columns 60.

As shown in the embodiment of the present invention described later, a speed-change ratio proportion of a change-speed ratio at an arbitrary n-speed change-speed stage to a speed-change ratio at a (n+1)-speed speed-stage is set at 0.725 or more.

The term "speed-change ratio proportion" here is a value obtained by dividing a speed-change ratio at a subsequent speed-stage by a speed-change ratio at a preceding speed-stage, i.e., [ratio at (n+1)-speed]/[ratio at n-speed].

Since the speed-change ratio proportion is set at 0.725 or more, a rotational difference between gears can be reduced. Shock occurring when the dog teeth 50 are engaged with the dog holes 70 (the lateral surfaces 90 of the dowel column 60) can be reduced. Thus, the engaging sound between the dogs can be suppressed to a low level.

As shown in the embodiment of the invention described later, a ratio change rate of the speed-change ratio proportion between arbitrary adjacent speed-stages is set at 7.5% or below.

The term "the ratio change rate" here is a value represented by the following expression:

$$[\{((\text{ratio at }(n+2)\text{-speed})/((\text{ratio at }(n+1)\text{-speed})\}-\{((\text{ratio at }(n+1)\text{-speed})/(\text{ratio at n-speed})\}]/[(\text{ratio at }(n+2)\text{-speed})/(\text{ratio at }(n+1)\text{-speed})]$$

Since the ratio change rate is set at 7.5% or below, a rotational ratio between gears can be reduced. Shock occurring when the dog teeth 50 are engaged with the dog holes 70 are reduced. Thus, the engaging sound of the dogs can be suppressed to a low level.

As shown in the embodiment of the present invention described later, a dog engagement difference rotational energy of the dog teeth 50 and the dog holes 70 is set at a level smaller than 30 joules.

The term "dog engagement difference rotational energy" means a difference between the rotational energy of a gear having the dog teeth 50 and that of a gear having the dog holes 70.

As described above, the dog engagement difference rotational energy of the dog teeth 50 and the dog holes 70 is set at a level smaller than 30 joules. Therefore, shock occurring when the dogs are engaged with each other can be reduced. Thus, an effect of reducing gear rattle can be produced.

At the time of changing the speed-stage of the twin-clutch TCL, such changing is usually waited while the gears of the speed-change stages to be subsequently switched are meshed with each other. For example, the dog teeth 50 and dog holes 70 of the rotating second-speed gears and of the not-rotating sixth-speed gears are engaged with each other at the time of switching to the first-speed. Thus, in particular large gear rattle is likely to occur. However, in the embodiment described above, the dog engagement difference rotational energy between the gear having the dog teeth 50 and the gear having the dog holes 70 is set at a level smaller than 30 joule. Therefore, the speed-change ratio proportion is set at 0.725 or above and further the ratio change rate is set at 7.5% or below. Thus, an effect of reducing the gear rattle can be produced extremely effectively.

Figure 9:
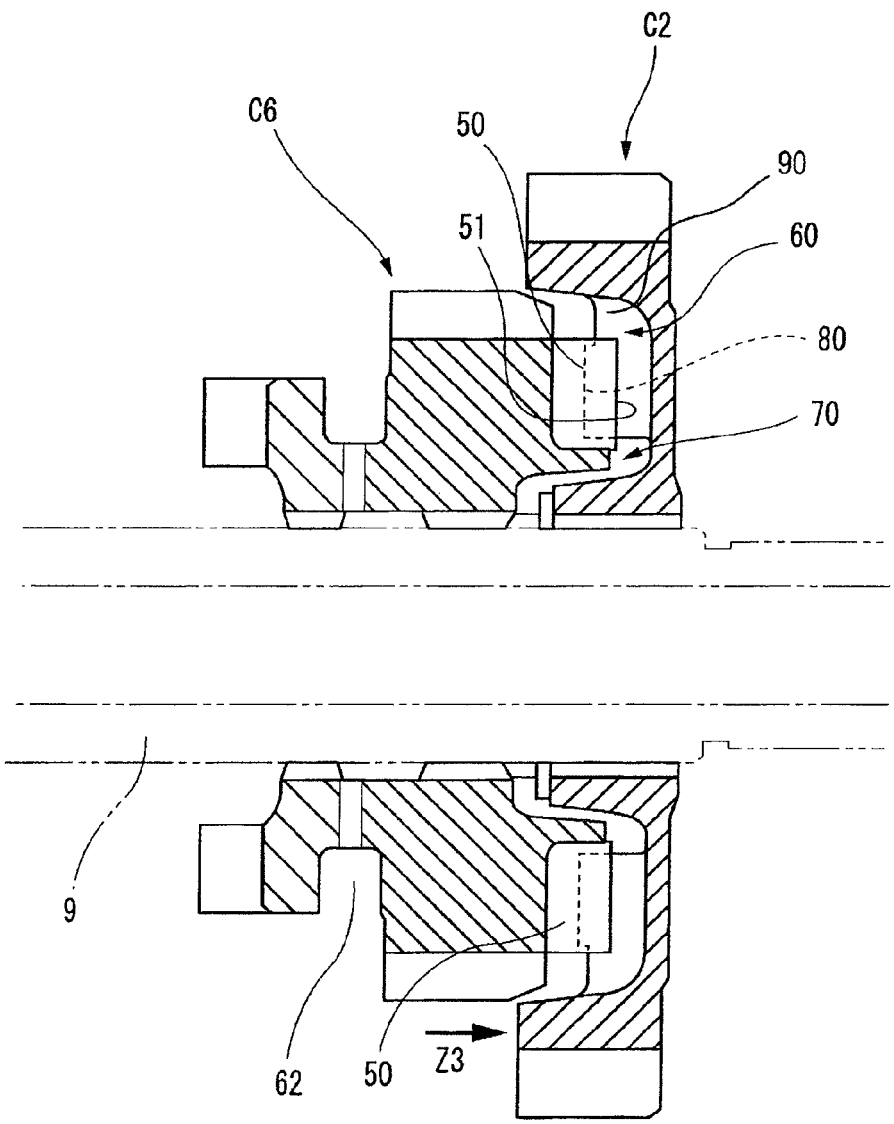
FIG. 9 is a schematic cross-sectional view illustrating an engaged state of the gear C6 with gear C2 of the transmission TM shown in FIG. 1.

The operation of the dog-clutch at the time of the shifting action from the first-speed to the second-speed is hereinafter described in detail with reference to FIGS. 1, 8 and 9.

During the travel at the first-speed gears in which the first clutch CL1 is engaged, the rotational drive force of the inner main shaft 7 is transmitted from the first-speed driven gear C1 to the fifth-speed driven gear C5.

In this case, the rotational drive force T of the inner main shaft 7 rotates the first-speed driven gear C1 in the clockwise direction in the figure. In addition, the fifth-speed driven gear C5 connected to the first-speed driven gear C1 by means of the dog-clutch is rotated in the clockwise direction while being driven by the first-speed driven gear C1.

In response to the shifting command from the first-speed to the second-speed, the first clutch CL1 is disengaged and the second clutch CL2 is engaged.

In other words, a change of the engaged state of the first clutch CL1 into that of the second clutch CL2 is performed.

A description will now be provided of the relationship between the second-speed driven gear C2 and the sixth-speed driven gear C6 at the time of the shifting action from the first-speed to the second-speed.

Incidentally, FIG. 8 illustrates a state before switching from the first clutch CL1 to the second clutch CL2 has been performed. FIG. 9 illustrates a state where the switching to the second clutch CL2 has been performed.

During traveling at the first-speed, the rotational drive force of the outer main shaft 6 is not applied to the second-speed driven gear C2 and the sixth-speed driven gear C6. In this case, the outer main shaft is rotated in a driven manner by the viscosity of the lubricating oil filled between the inner main shaft 7 and the outer main shaft 6. Thus, the second-speed driven gear C2 is rotated clockwise. The rotational speed of the second-speed driven gear C2 is higher than that of the sixth-speed driven gear C6 driven rotated by the counter shaft 9.

In response to the shifting command from the first-speed to the second-speed, the change of the engaged state of the first clutch CL1 into that of the second clutch CL2 is performed. In this case, the rotational drive force T of the outer main shaft 6 is applied to the second-speed driven gear C2 (the state shown in FIG. 8).

The shift drum 30 is operatively driven by the shifting mechanism 20 so that the opposite wall surface 51 may approach (shift in the direction of arrow Z1) the other opposite wall surface 80. Consequently, as shown in FIG. 9, the dog teeth 50 enter the dog holes 70 (shift in the direction of arrow Z3 in), so that the dog teeth 50 engage the lateral surfaces 90 of the dowel columns 60, thereby keeping this state. Thus, the upshift to the second-speed is completed.

Working examples to which the dog-clutch transmission system of the present invention is applied are described in comparison to comparative examples.

Incidentally, the working examples are implemented on a motorcycle. In addition, working examples 1 to 4 are implemented on the twin-clutch type dog-clutch transmission system 1 shown in FIG. 1. Similarly to the working examples, comparative examples 1 to 4 are implemented on a motorcycle having a twin-clutch type automatic transmission system to which conditions different from those of the working examples are applied.

Working Example 1

The present working example has the following conditions for the numbers of gears from first-speed to sixth-speed.
Implementing conditions:
1) The numbers of the teeth for the first-speed: 15:37;
2) The numbers of the teeth for the second-speed: 19:34;
3) The numbers of the teeth for the third-speed: 22:31;
4) The numbers of the teeth for the fourth-speed: 25:29;
5) The numbers of the teeth for the fifth-speed: 31:32; and
6) The numbers of the teeth for the sixth-speed: 33:31.

Working Example 2

The present working example has the following conditions for the numbers of gears from first-speed to sixth-speed.
Implementing conditions:
1) The numbers of the teeth for the first-speed: 17:47;
2) The numbers of the teeth for the second-speed: 19:35;
3) The numbers of the teeth for the third-speed: 23:33;
4) The numbers of the teeth for the fourth-speed: 27:32;
5) The numbers of the teeth for the fifth-speed: 31:32; and
6) The numbers of the teeth for the sixth-speed: 33:31.

Working Example 3

The present working example has the following conditions for the numbers of gears from first-speed to sixth-speed.
Implementing conditions:
1) The numbers of the teeth for the first-speed: 17:41;
2) The numbers of the teeth for the second-speed: 19:34;
3) The numbers of the teeth for the third-speed: 23:30;
4) The numbers of the teeth for the fourth-speed: 29:30;
5) The numbers of the teeth for the fifth-speed: 34:32; and
6) The numbers of the teeth for the sixth-speed: 35:31.

Working Example 4

The present working example has the following conditions for the numbers of gears from first-speed to sixth-speed.

Implementing conditions:
1) The numbers of the teeth for the first-speed: 16:36;
2) The numbers of the teeth for the second-speed: 20:34;
3) The numbers of the teeth for the third-speed: 23:30;
4) The numbers of the teeth for the fourth-speed: 28:31;
5) The numbers of the teeth for the fifth-speed: 30:29; and
6) The numbers of the teeth for the sixth-speed: 35:31.

Comparative Example 1

The present comparative example has the following conditions for the numbers of gears from first-speed to sixth-speed.
Implementing conditions:
1) The numbers of the teeth for the first-speed: 17:41;
2) The numbers of the teeth for the second-speed: 20:34;
3) The numbers of the teeth for the third-speed: 23:30;
4) The numbers of the teeth for the fourth-speed: 29:30;
5) The numbers of the teeth for the fifth-speed: 34:32; and
6) The numbers of the teeth for the sixth-speed: 35:31.

Comparative Example 2

The present comparative example has the following conditions for the numbers of gears from first-speed to sixth-speed.
Implementing conditions:
1) The numbers of the teeth for the first-speed: 15:40;
2) The numbers of the teeth for the second-speed: 21:40;
3) The numbers of the teeth for the third-speed: 22:32;
4) The numbers of the teeth for the fourth-speed: 25:30;
5) The numbers of the teeth for the fifth-speed: 30:31; and
6) The numbers of the teeth for the sixth-speed: 37:31.

Figure 11:
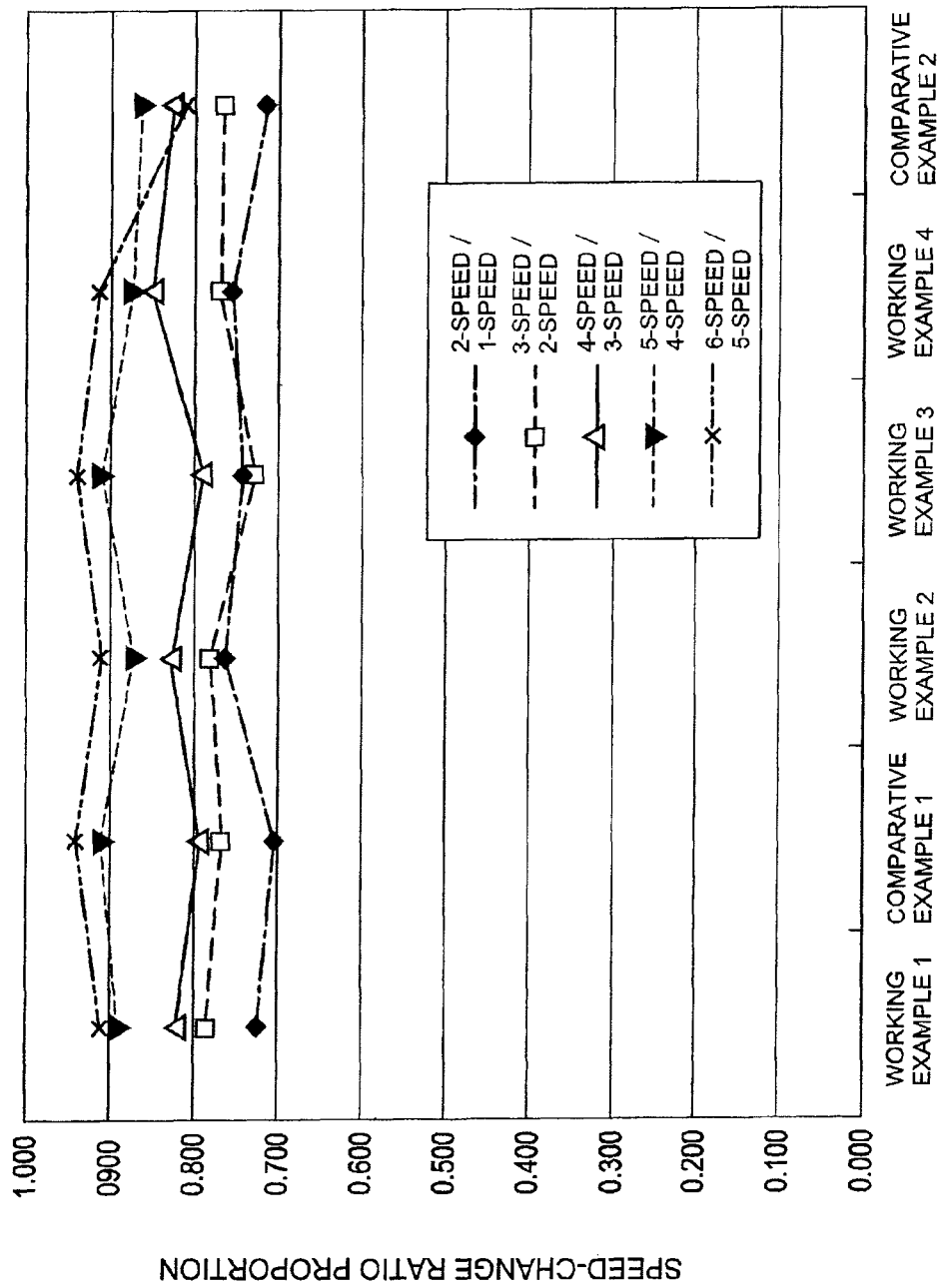
FIG. 11 is a graph showing, for every speed-stage, speed-change ratio proportions in the working examples of the present invention and comparative examples.

Working examples 1 to 4 and comparative examples 1 to 2 were evaluated for a speed-change ratio proportion of a speed-change ratio at a specified speed-change stage to a speed-change ratio at the next speed-change stage by observing gear rattle resulting from dog-engagement at the time of shifting. Incidentally, a list of the speed-change ratio proportion of the working examples and of the comparative examples is shown in FIG. 10 and its graph is shown in FIG. 11.

The working examples and the comparative examples are evaluated from the observation results of gear rattle resulting from dog-engagement. Gear rattle caused by the upshift from the first-speed to the second-speed is largely recognized; however, it is not problematic at high-speed stages. Specifically, the gear rattle is largely recognized at a speed-change ratio proportion of 0.705 in comparative example 1 and at of 0.714 in comparative example 2. In contrast to this, the gear rattle is not recognized so much at a speed-change ratio proportion of 0.725 in working example 1, which exhibits a satisfactory result.

This shows the following: The dog-clutch transmission system is such that the speed-change ratio proportion of a speed-change ratio at an arbitrary n-speed speed-stage to a speed-change ratio at a (n+1)-speed speed-stage is set at 0.725 or above. In this case, engaging sound of dogs can be suppressed to a low level. Since the speed-change gear ratio proportion is set at 0.725 or above, a rotational difference between gears can be reduced, which can reduce shocks occurring when dog teeth and dog holes are engaged with each other. As a result, gear rattle can be suppressed.

A ratio change rate was determined at low-speed stages where gear rattle resulting from dog-engagement is most easily recognized, specifically, between first-speed and second-speed and between second-speed and third-speed. The results of such determinations are shown in FIG. 12.

The results show the following: In working examples 2, 3 and 4, their ratio change rates are from −1.78% to 1.93%. In these cases, in particular, gear rattle is suppressed to a low level, which provides the good results.

In contrast to this, in comparative examples 1, 3 and 4, their ratio change rates are set at numerical values of as very large as 7.82% to 8.08%. In these cases, gear rattle is large, which gives a sense of discomfort. On the basis of the observation results, comparative examples 1, 3 and 4 were examined in further detail. As a result, ratio change rates are suppressed to 7.5% or below at any speed-stage, which can reduce the engaging sound of dogs. Also in these cases, an inter-gear rotational difference between speed-change gears can be reduced. Consequently, shock occurring when the dog teeth and the dog holes are engaged with each other for shifting can be suppressed to a low level.

The dog engagement difference rotational energy between dog teeth and dog holes was examined.

For the dog engagement difference rotational energy, a study was made on first-speed and second speed at which the dog engagement difference rotational energy is largest. Its results are shown in FIG. 13 and its details are described below.

Dog engagement difference rotational energy at the first-speed and the second-speed in working example 3 is 27.8 J (joule) and sound pressure is 83.2 dB (decibel) (its sound pressure value is a value determined in an anechoic room). The results of the gear rattle observation are satisfactory. Dog engagement difference rotational energy at the first-speed and the second-speed in working example 4 is 29.5 J (joule) (the rotational energy is a value determined at an engine speed of 3000 rpm) and sound pressure is 84.0 dB (decibel). The results of the gear rattle observation are satisfactory.

In contrast to this, dog engagement difference rotational energy at the first-speed and the second-speed in comparative example 1 is 31.9 J (joules) and sound pressure is 84.7 dB (decibel). The results of the gear rattle observation are bad because the gear rattle is at such a level as to be distinctly recognizable.

Figure 13:
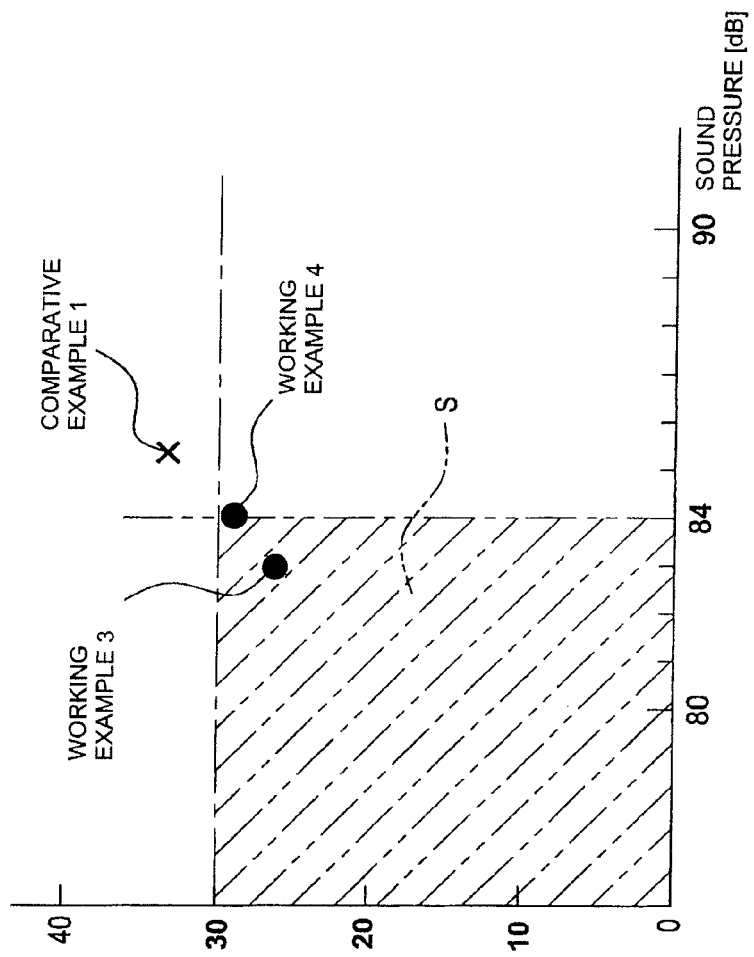
FIG. 13 is a graph showing dog-engagement difference rotational energy and sound pressure in the working examples of the invention and the comparative examples.

On the basis of the results, as shown in FIG. 13, if the dog engagement difference rotational energy is at a numerical value equal to or below 30.0 J (joules), the level of sound pressure is at 84.0 dB (decibels), which falls within a gear rattle not-recognizable range S. The gear rattle occurring when the dog teeth and the dog holes are engaged with each other for shifting is small and thus a shift-operational feeling is satisfactory.

The description has thus far been given of the embodiment of the automatic transmission system of a motorcycle to which the present invention is applied. However, the invention is not limited to this embodiment but can be applied to a manual-type dog-clutch transmission system. Additionally, the invention can be applied to straddle-ride type vehicles including e.g. two-wheeled vehicles as well as three-wheeled vehicles (three-wheeled buggies) and four-wheeled buggies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dog-clutch transmission system comprising:
   first gears installed adjacent to each other on respective shafts so as not to be rotatable relatively to the respective shafts and to be axially slidable; and
   second gears installed so as to be rotatable relatively to the respective shafts and not to be axially slidable,
   wherein each of the first gears have dog-teeth projecting in an axial direction and each of the second gears have dog-holes recessed in the axial direction,
   wherein speed-stages are switchable by bringing the dog-teeth and the dog-holes into engagement and disengagement,
   wherein a speed-change ratio proportion of a change-speed ratio at an arbitrary n-speed speed-stage to a speed-change ratio at a (n+1)-speed speed-stage is set at 0.725 or more, and
   wherein a dog engagement difference rotational energy of the dog-teeth and the dog-holes is smaller than 30 joules.

2. The dog-clutch transmission system according to claim 1, wherein a ratio change rate between a speed-change ratio proportion of the change-speed ratio at the arbitrary n-speed speed-stage to the speed-change ratio at the (n+1)-speed speed-stage and a speed-change ratio proportion of the change-speed ratio at the (n+1)-speed speed-stage to a speed-change ratio at a (n+2)-speed speed-stage is set at 7.5% or below.

3. The dog-clutch transmission system according to claim 1, further comprising an automatic shifting mechanism having a shifting actuator for axially displacing the first gears.

4. The dog-clutch transmission system according to claim 2, further comprising an automatic shifting mechanism having a shifting actuator for axially displacing the first gears.

5. The dog-clutch transmission system according to claim 3, further comprising:
   a first clutch for connecting and disconnecting power transmitted to a first gear shaft having odd-speed-stage gears thereon;
   a second clutch for connecting and disconnecting power transmitted to a second gear shaft having even-speed-stage gears; and
   a twin-clutch type automatic transmission for performing shifting by alternately switching the first clutch and the second clutch.

6. The dog-clutch transmission system according to claim 4, further comprising:
   a first clutch for connecting and disconnecting power transmitted to a first gear shaft having odd-speed-stage gears thereon;
   a second clutch for connecting and disconnecting power transmitted to a second gear shaft having even-speed-stage gears; and
   a twin-clutch type automatic transmission for performing shifting by alternately switching the first clutch and the second clutch.

7. A dog-clutch transmission system comprising:
   a main shaft;
   a counter shaft;
   a plurality of first gears installed on the main shaft and the counter shaft, respectively, said plurality of first gears not being rotatable relatively to the main shaft and counter shaft and being axially slidable; and
   a plurality of second gears installed so on the main shaft and counter shaft, respectively, said plurality of second gears being rotatable relatively to the main shaft and counter shaft and not being axially slidable,
   wherein each of the plurality of first gears has dog-teeth projecting in an axial direction and each of the plurality of second gears has dog-holes recessed in the axial direction,
   wherein speed-stages are switchable by bringing the dog-teeth and the dog-holes into engagement and disengagement,
   wherein a speed-change ratio proportion of a change-speed ratio at an arbitrary n-speed speed-stage to a speed-change ratio at a (n+1)-speed speed-stage is set at 0.725 or more, and
   wherein a dog engagement difference rotational energy of the dog-teeth and the dog-holes is smaller than 30 joules.

8. The dog-clutch transmission system according to claim 7, wherein a ratio change rate between a speed-change ratio proportion of the change-speed ratio at the arbitrary n-speed speed-stage to the speed-change ratio at the (n+1)-speed speed-stage and a speed-change ratio proportion of the change-speed ratio at the (n+1)-speed speed-stage to a speed-change ratio at a (n+2)-speed speed-stage is set at 7.5% or below.

9. The dog-clutch transmission system according to claim 7, further comprising an automatic shifting mechanism having a shifting actuator for axially displacing the first gears.

10. The dog-clutch transmission system according to claim 8, further comprising an automatic shifting mechanism having a shifting actuator for axially displacing the first gears.

11. The dog-clutch transmission system according to claim 9, further comprising:
    a first clutch for connecting and disconnecting power transmitted to a first gear shaft having odd-speed-stage gears thereon;
    a second clutch for connecting and disconnecting power transmitted to a second gear shaft having even-speed-stage gears; and
    a twin-clutch type automatic transmission for performing shifting by alternately switching the first clutch and the second clutch.

12. The dog-clutch transmission system according to claim 10, further comprising:
    a first clutch for connecting and disconnecting power transmitted to a first gear shaft having odd-speed-stage gears thereon;
    a second clutch for connecting and disconnecting power transmitted to a second gear shaft having even-speed-stage gears; and
    a twin-clutch type automatic transmission for performing shifting by alternately switching the first clutch and the second clutch.

13. The dog-clutch transmission system according to claim 7, wherein the main shaft comprises an inner main shaft and an outer main shaft, and at least one of the plurality of first gears is installed on the inner main shaft and at least one of the plurality of first gears is installed on the outer main shaft.

* * * * *